(12) United States Patent
Keller

(10) Patent No.: US 12,046,862 B2
(45) Date of Patent: Jul. 23, 2024

(54) CONNECTION DEVICE FOR GROUNDING AN ELECTRICAL APPARATUS AND/OR CREATING AN EQUIPOTENTIAL LINK BETWEEN CONDUCTIVE ELEMENTS

(71) Applicant: Mobasolar, Wolfgantzen (FR)

(72) Inventor: Marc Keller, Oberhergheim (FR)

(73) Assignee: Mobasolar, Wolfgantzen (FR)

( * ) Notice: Subject to any disclaimer, the term of this patent is extended or adjusted under 35 U.S.C. 154(b) by 84 days.

(21) Appl. No.: 17/625,833

(22) PCT Filed: Jun. 26, 2020

(86) PCT No.: PCT/EP2020/068068
§ 371 (c)(1),
(2) Date: Sep. 16, 2022

(87) PCT Pub. No.: WO2021/004815
PCT Pub. Date: Jan. 14, 2021

(65) Prior Publication Data
US 2023/0025781 A1 Jan. 26, 2023

(30) Foreign Application Priority Data
Jul. 11, 2019 (FR) ...................................... 1907825

(51) Int. Cl.
*H01R 4/66* (2006.01)
*H01R 4/2407* (2018.01)
(Continued)

(52) U.S. Cl.
CPC ............ *H01R 4/66* (2013.01); *H01R 4/2407* (2018.01); *H01R 4/64* (2013.01); *H02S 40/34* (2014.12)

(58) Field of Classification Search
None
See application file for complete search history.

(56) References Cited

U.S. PATENT DOCUMENTS 3,340,494 A * 9/1967 Gutshall ................ H01R 11/12
411/149
8,590,223 B2 11/2013 Kilgore et al.
(Continued)

OTHER PUBLICATIONS

ISA/EPO International Search Report for corresponding International No. PCT/EP2020/068068 dated Sep. 1, 2020 (3 pgs).
(Continued)

*Primary Examiner* — Ross N Gushi
(74) *Attorney, Agent, or Firm* — Harris Beach PLLC

(57) ABSTRACT

The invention relates to a connection device for earthing an electrical apparatus or putting it at a reference potential. It is inserted between a first electrically conductive part belonging to said electrical apparatus and a second part belonging to a support structure on which said electrical apparatus is mounted and which may be at least partly electrically insulating. It is characterized in that it comprises a first automatic connection area for automatically creating electrical contact with said first part, and a second automatic connection area for automatically creating electrical contact with an electrical conductor that is earthed or connected to a reference potential, when said electrical apparatus is mounted on said support structure. The electrical apparatus is thus automatically earthed or connected to a reference potential when it is mounted on said support structure via said connection device and said electrical conductor, specifically without any tools, screws or any other fastening member.

4 Claims, 4 Drawing Sheets

(51) Int. Cl.
  *H01R 4/64* (2006.01)
  *H02S 40/34* (2014.01)

(56) References Cited

U.S. PATENT DOCUMENTS

| | | |
|---|---|---|
| 9,742,350 B2 | 8/2017 | McPheeters |
| 2018/0090856 A1 | 3/2018 | Martin |
| 2019/0154306 A1* | 5/2019 | Rothschild .............. F24S 25/67 |

OTHER PUBLICATIONS

IPEA/EP European Patent Office, International Preliminary Report on Patentability for Corresponding International Application No. PCT/EP2020/068068 dated May 21, 2021 in the English language (5 pgs).

Response to International Search Report and Written Opinion for PCT/EP2020/068068 dated Apr. 22, 2021 (13 pages).

\* cited by examiner

CONNECTION DEVICE FOR GROUNDING AN ELECTRICAL APPARATUS AND/OR CREATING AN EQUIPOTENTIAL LINK BETWEEN CONDUCTIVE ELEMENTS

CROSS-REFERENCE TO RELATED APPLICATIONS

This application is a national stage application under 35. U.S.C. § 371 of PCT Application No PCT/EP2020/068068, filed on Jun. 26, 2020, which claims priority to and the benefit of French Application No. 1907825 filed on Jul. 11, 2019, which are incorporated herein by reference in their entirety.

TECHNICAL FIELD

The present invention relates to a connection device for earthing an electrical apparatus and/or for creating an equipotential link between two conductive elements, arranged to be inserted between a first part and a second part, said first part belonging to said electrical apparatus and being electrically conductive, and said second part belonging to a support structure on which said electrical apparatus is mounted and which may be at least partly electrically insulating, said connection device comprising a first automatic connection area for automatically creating electrical contact between said connection device and said first part when said electrical apparatus is mounted on said support structure.

PRIOR ART

In any electrical installation, the electrically conductive parts, such as frame, chassis, support, etc., which are generally made from metal, must be connected by an equipotential link, which is earthed to meet electrical safety standards, to guarantee the absence of electrical potential in the installation, and thus to allow leakage currents to flow to earth in the event of anomalies, lightning, etc. These electrical safety standards are in force in most countries. In the more specific field of installations of photovoltaic panels, solar panels, hybrid solar/photovoltaic panels or the like, the metal frame of each of the panels must be individually earthed. Conventionally, this earthing is done by wiring using an electrical conductor, which is fastened to the metal frame of each panel using lugs and screws through holes or internal threads made directly in said frame. This wiring operation may only be done by an authorised electrician, requires relatively lengthy operating time on site, and can prove complex or even dangerous depending on the location of the installation, in particular when it is located high on building roofs. Moreover, if the support structure of said panels is discontinuous and formed by individual metal support members, each of the support members must also be earthed by a specific electrical conductor, resulting in an even more time-consuming wiring operation.

Publications US 2018/090856 A1 and U.S. Pat. No. 9,742,350 B2 describe fastening systems provided with a screw bolt making it possible to fasten an earthing cable on a rail, which rail supports a photovoltaic panel. These systems require that the rail as well as the connection between the rail and the frame of the photovoltaic panel ensure good electrical conduction.

Publication U.S. Pat. No. 8,590,223 B2 describes a fastening clip arranged between two frames of adjacent photovoltaic panels, and including two C-shaped mounting areas connected to one another by a bridge. Each mounting area fits on a wing of one of the frames, and comprises teeth in order to create electrical contact so as to electrically connect the frames to one another. The clip further includes a median U-shaped mounting area that fits into a rail in line with the junction between the frames. The clip allows the frames to be earthed either via the rails, which in turn are earthed by a cable, which means that the rails are electrically conductive, or via a cable connected to each of the clips by an eyelet screwed into a hole provided in each clip.

Publication WO 2012/123797 A2 by the applicant proposes an alternative solution, which eliminates the drawbacks of the conventional wiring method, owing to an electrically conductive individual connection part, made from spring steel, and provided with self-connecting ends in the form of sharp toothings. This part, known by the name "earthing claw" or under the brand TERRAGRIF®, has the advantage of being inserted between the metal frame of the panel and the metal support structure during the mounting of said panel, of automatically creating electrical contact and of thus ensuring the equipotential bonding between said structure and said panel. It advantageously replaces the wiring of multiple electrical conductors screwed into the panel frames and the structure either directly, or using dedicated fastening systems like those described in the publications mentioned above. Only one earthing cable remains, the one ultimately connecting the metal support structure to the earth.

This alternative solution implies that the support structure is electrically conductive and continuous, like for example rails that form a grid structure. Now, some manufacturers propose metal support structures, but made from materials with a low electrical conductivity and/or which are fastened on an insulating receiving surface (PVC, Bitumen, etc.), or non-metallic support structures, which are therefore electrically insulating (synthetic, composite, etc.). Furthermore, the support structures can be periodic or discontinuous and formed by individual support members. If these support members are metallic and electrically conductive, then they must also be earthed. In these various cases and in addition to the earthing claws, each electrically conductive assembly, and where appropriate each support member, must be earthed by an electrical conductor, firmly screwed with a bolt or a self-tapping screw and, where appropriate (depending on the nature of the materials used), a bimetal washer to limit stacking effects.

DESCRIPTION OF THE INVENTION

The present invention aims to solve this problem by proposing a new electrical connection device making it possible to improve, facilitate and optimize the earthing and/or the equipotential link of any type of electrical installation, independent of the nature of the support structure, whether or not it is electrically conductive, whether it is continuous or discontinuous, this new device being particularly simple and quick to install, not requiring screws, tools or additional fastening members, this device being particularly reliable, secure, without difficulty, accessible to unqualified personnel, ergonomic, versatile and guaranteed over time irrespective of the climate or environmental conditions.

To this end, the invention relates to a connection device of the type indicated in the preamble, characterized in that it further comprises a second automatic connection area arranged to automatically create electrical contact between said connection device and an electrical conductor when said electrical apparatus is mounted on said support structure, such that an equipotential link is created automatically between at least said electrical apparatus and said electrical conductor when it is mounted on said support structure via said connection device and said electrical conductor, earthed or connected to a reference potential, without tools, screws or other fastening members.

In a preferred form of the invention, said device comprises an electrically conductive blade, and said first automatic connection area and said second automatic connection area are advantageously formed in said blade by cutting and bending. Said blade is preferably made from spring steel.

Said device advantageously comprises a mounting area arranged to assemble said connection device to one of said first and second parts by fitting, said mounting area comprising an assembly plane arranged to be inserted between said first and second parts. Said mounting area can have a U-shaped section made by bending said blade, and comprise a median portion forming said assembly plane.

In the preferred form of the invention, said first automatic connection area comprises a pointed toothing projecting from said assembly plane, arranged to become embedded in the material of said first part when said electrical apparatus is mounted on said support structure. The toothing of said first automatic connection area can be formed by cutting and bending in a bent portion of said blade.

In the preferred embodiment of the invention, said second automatic connection area comprises a through housing arranged to receive a segment of said electrical conductor, and a punching member arranged in line with said housing and arranged to be embedded at least partially in said electrical conductor and simultaneously to keep it in position in said housing.

Said punching member advantageously projects from said assembly plane and is movable between a passive position, in which it opens said housing to be able to introduce said electrical conductor when said electrical apparatus is not mounted on said support structure, and an active position, in which it closes said housing and is embedded in said electrical conductor when said electrical apparatus is mounted on said support structure.

This housing can be formed by cutting and bending or cambering in a bent portion of said blade, and the punching member can be formed by an L-shaped tab cut into a straight part of said blade, connected at one of its ends to said blade by a bend forming an articulation and provided at the other end with at least one pointed and/or notched tooth forming a punch.

Preferably, said device further comprises retaining means arranged to be embedded in the material of the part with which it is assembled of said first and second parts and to prevent its removal, and simultaneously to create electrical contact with said part with which it is assembled if it is electrically conductive.

Said retaining means may be formed by pointed teeth, obtained by cutting and bending in bent parts of said blade, arranged in opposition and projecting inside said mounting area.

These retaining means may further form an automatic connection area that completes or replaces said first automatic connection area if the part with which it is assembled corresponds to said first part.

According to variant embodiments, the device may comprise a third automatic connection area obtained by cutting and bending said blade in a straight part, which completes or replaces said first automatic connection area, and comprising at least one pointed tooth projecting from said assembly plane. Said third automatic connection area can be superimposed on said punching member.

According to the variant embodiments of the invention, said device may comprise two pairs of a first automatic connection area and a second automatic connection area, the two pairs being distant from one another, arranged in parallel and arranged to automatically connect, to the earth or to a reference potential, two electrical apparatuses that are arranged side by side and mounted on a support structure.

Owing to its original design, the connection device according to the invention is versatile and is appropriate for all possible configurations, since it equally allows the earthing of:
- electrical apparatuses mounted on an electrically insulating support structure,
- electrical apparatuses mounted on an electrically conductive support structure, which in turn is fastened on an electrically insulating receiving surface, and
- electrical apparatuses mounted on an electrically conductive support structure, which in turn is fastened on an electrically conductive receiving surface.

BRIEF DESCRIPTION OF THE FIGURES

The present invention and its advantages will appear better in the following description of several embodiments provided as non-limiting examples, with reference to the appended drawings, in which.

DETAILED DESCRIPTION OF THE INVENTION

In the illustrated exemplary embodiments, identical elements or parts bear the same reference numbers.

Figure 1:
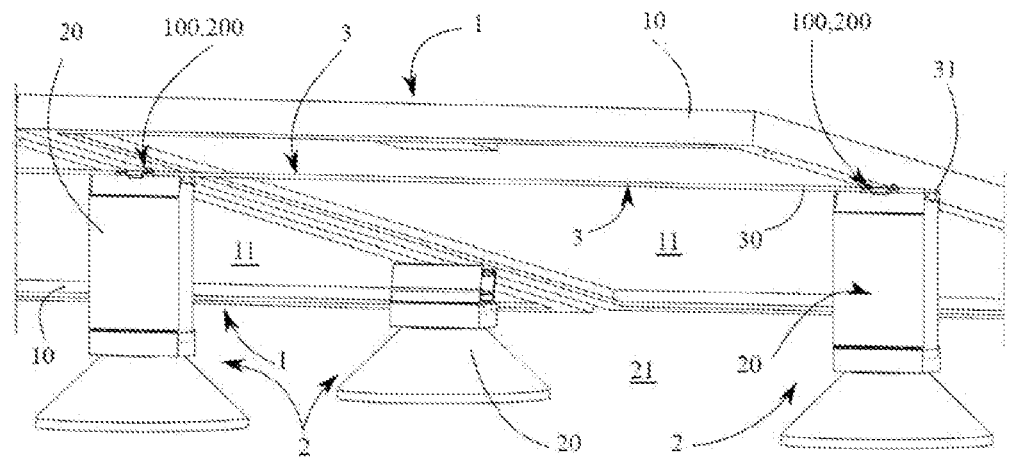
FIG. 1 is a perspective view of a portion of an electrical installation showing an example layout of the connection device according to the invention.
Figure 2:
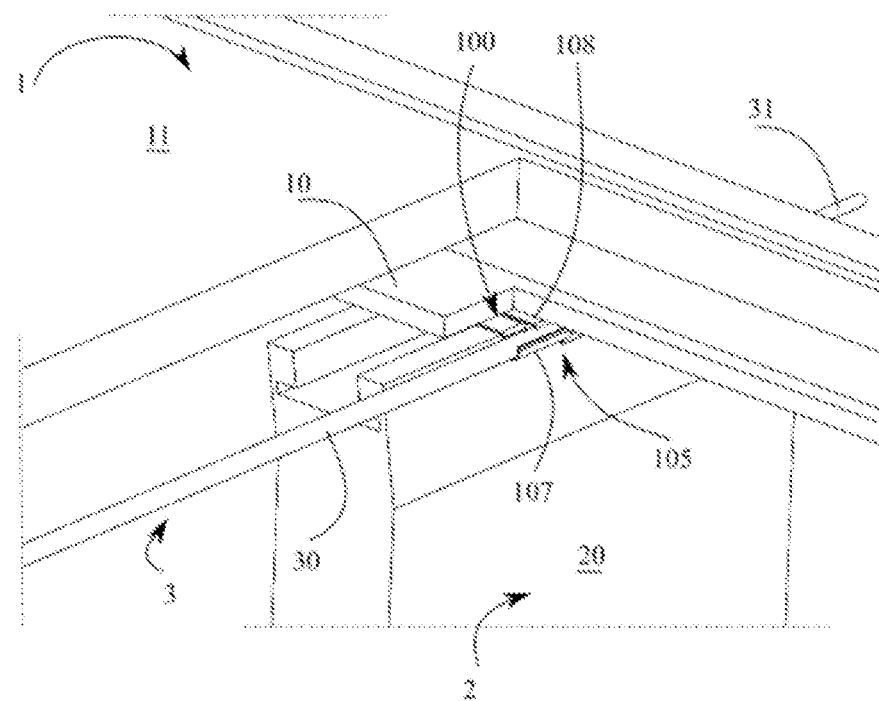
FIG. 2 is an enlarged detail view of the installation of FIG. 1 in partial section in line with the connection device.

In reference to the figures and more particularly to FIG. 1, the connection device 100, 200, 300 according to the invention is made from an electrically conductive material and is arranged to facilitate the creation of an equipotential link, and if applicable the earthing of electrical apparatuses 1 mounted on a support structure 2 by being inserted between a first part 10 belonging to the electrical apparatuses 1 and a second part 20 belonging to the support structure 2. The term "electrical apparatus" refers to any element that can be electrically conductive, and the term "support structure" refers to any receiving surface. The first part 10 is generally made from electrically conductive, essentially metallic materials, while the second part 20 can be made in whole or in part from electrically conductive materials, electrically insulating materials and/or materials with a low electrical conductivity. In the context of the invention, the connection device 100, 200, 300 is associated with an electrical conductor 3, which runs along said electrical apparatus 1 continuously or discontinuously. This electrical conductor 3 traditionally comprises a strand of copper wires 31 that may or may not be protected by an insulating sheath 30. This electrical conductor 3 can be earthed to create an equipotential link equal to zero, or to a reference potential depending on the installations in question.

FIG. 1 illustrates an example application of the invention to an installation of photovoltaic panels 11 each provided with a metal frame, constituting said first electrically conductive part 10 to be earthed. The photovoltaic panels 11 are arranged side by side to cover a surface, and in the illustrated example, are mounted on mounting pads, constituting said second part 20, the mounting pads being fastened on a receiving surface 21. Each photovoltaic panel 11 can be supported by several mounting pads, and the mounting pads may or may not be shared by two adjacent photovoltaic panels 11. Furthermore, the mounting pads may or may not be of equal height depending on whether the photovoltaic panels 11 are fastened parallel to the receiving surface 21 or with an incline, as shown in FIG. 1. Of course, any other type of support structure 2 with a different mounting mode may be suitable, the location, shape and design of which are appropriate for the application and the intended use of the installation. The support structure 2 may be arranged on the ground or at a height, designed to define a receiving surface of generally planar, curved or complex shape, arranged in a general horizontal, vertical or inclined plane, and defined by periodic or discontinuous support members such as pads, rail segments, or by continuous support members such as rails, or by a combination of the two, as well as by any other equivalent support means, made from any type of materials without exception, since the criterion of electrical conductivity is not critical in the present invention, such as aluminium and alloys thereof, synthetic and composite materials, natural wood-based materials, etc. Once again, the invention is not limited to installations of photovoltaic panels, but extends to any application implementing electrical components that require earthing, such as solar panels, hybrid solar/photovoltaic panels or the like, inverters or micro-inverters, metal structures of all kinds, cable trays, Faraday cages, machine frames, technical work booths (e.g. paint booths), etc., these examples not being limiting.

Figure 3:
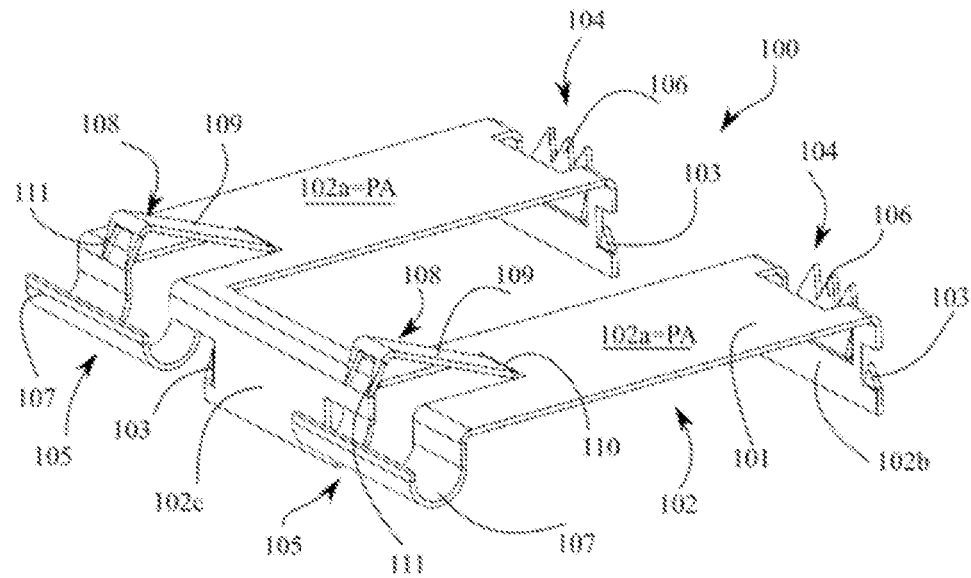
FIG. 3 is a perspective view of a connection device according to a first embodiment of the invention, taken from one side.
Figure 4:
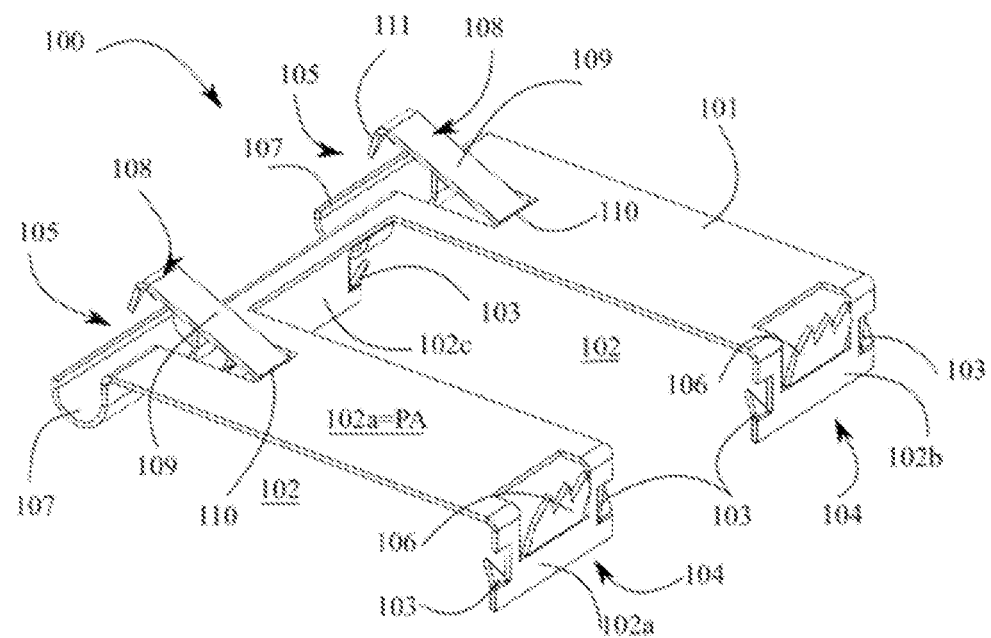
FIG. 4 is a perspective view of the connection device of FIG. 3, taken from the opposite side.
Figure 7:
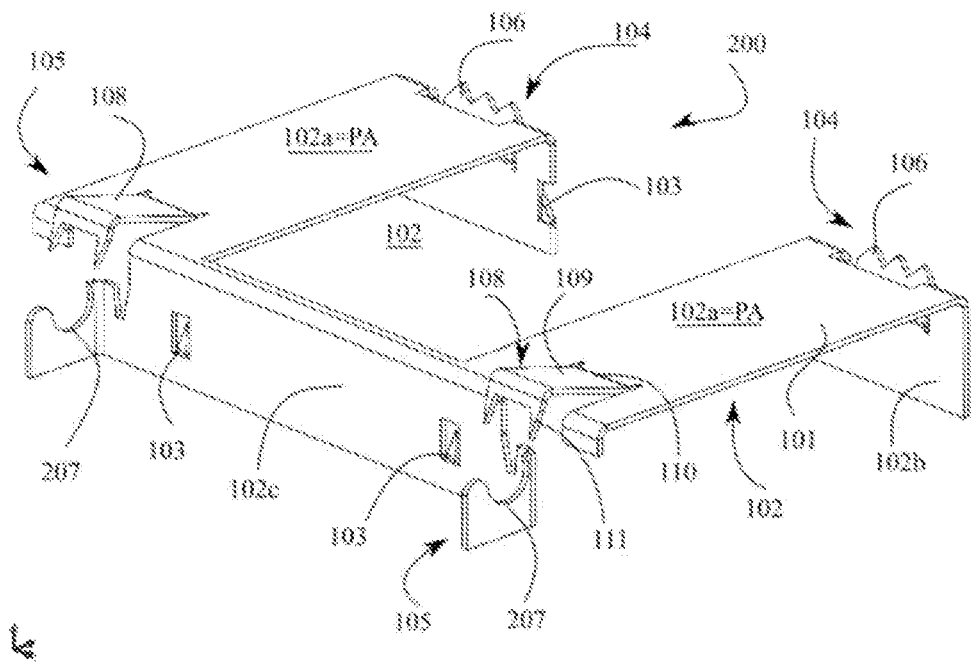
FIG. 7 is a view similar to FIG. 3 of a connection device according to a second embodiment of the invention.
Figure 8:
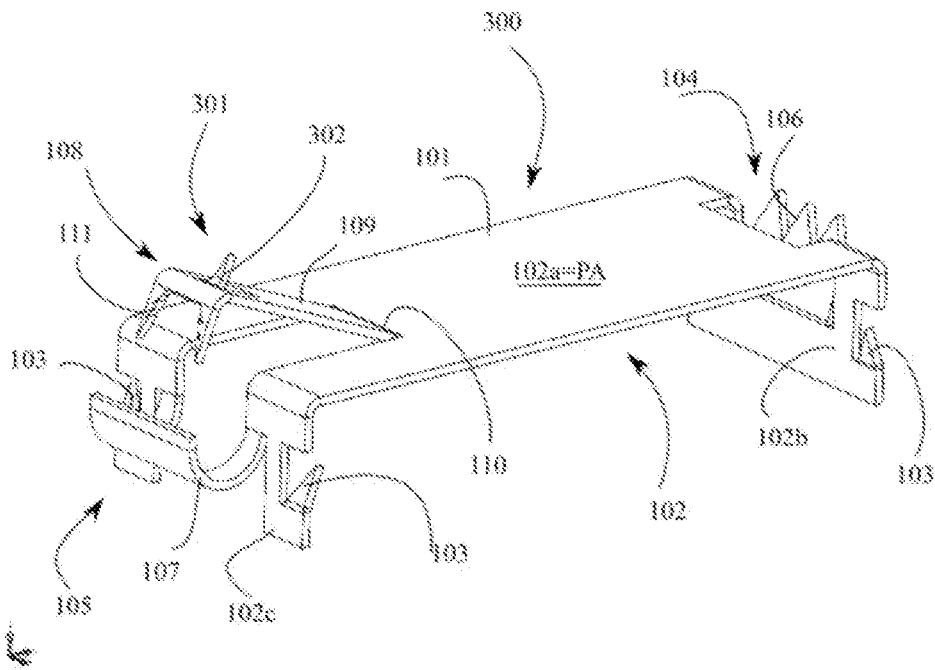
FIG. 8 is a view similar to FIG. 3 of a connection device according to a third embodiment of the invention.

The connection device 100, 200, 300 is shown in detail in FIGS. 3 and 4 according to a first embodiment, in FIG. 7 according to a second embodiment and in FIG. 8 according to a third embodiment. It comprises or is made up of a blade 101 cut from a strip of metallic and resilient material, preferably from a strip of stainless spring steel. This strip of material can have a relatively small thickness for example comprised between 0.5 mm and 1 mm, these values not being limiting. Of course, any other technically equivalent material, with good electrical conductivity and elasticity properties, may be suitable. This material may or may not further comprise a thermal and/or chemical surface treatment in order to add properties, for example of protection, depending on the nature of the parts 10, 20 present and/or of the ambient environment.

In the illustrated examples, the connection device 100, 200, 300 has a generally U-shaped section, formed by bending said blade 101, to create a mounting area 102 either inside the U or outside the U, to assemble the connection device 100, 200, 300 to one of the first and second parts 10, 20, without tools, and preferably by tight fitting. The mounting area 102 is defined by a planar median portion 102a of the blade 101 forming an assembly plane PA between the two parts 10, 20, and two end portions 102b, 102c of the blade 101 forming two support planes on one of the parts 10, 20. The two end parts 102b, 102c may or may not be parallel to one another. In the illustrated example, the connection device 100, 200, 300 is fitted on the free end of the second part 20. The free end of this second part 20 is planar and can receive a corresponding planar surface of the first part 10 belonging to said electrical apparatus 1. Thus, the planar median part 102a of the blade 101 forming said assembly plane PA is inserted and sandwiched between the two parts 10 and 20, and the end parts 102b, 102c of the blade 101 are located on either side of the side walls of the second part 20. Of course, the shape and the section of the connection device 100, 200, 300 that define the mounting area 102 and assembly plane PA thereof can vary in order to adapt to the shape and the section of the part 10, 20 to which it must fit. The shape of the mounting area 102 is therefore not limited to a U shape. Furthermore, the connection device 100, 200, 300 can be fitted on or in the free end of one of the first and second parts 10, 20, in the location shown in the figures or upside down if it is assembled to the first part 10.

The connection device 100, 200, 300 is further provided with retaining means 103 arranged to be embedded in the material of the part 10, 20 on which it is assembled, and to prevent the accidental removal thereof. In the illustrated example, these retaining means 103 are formed by teeth, preferably pointed, obtained by cutting and bending in the end portions 102b, 102c of the blade 101, arranged in opposition, and oriented to project inside the mounting area 102. Thus, these retaining means 103 serve to oppose the removal of said connection device 100, 200, 300 like a harpoon. Of course, any other technically equivalent form of retaining means may be suitable. These retaining means 103 also serve to create an electrical contact with the part 10, 20 with which the connection device 100, 200, 300 is assembled, if this part is electrically conductive. They then form a completely separate automatic connection area. If the connection device 100, 200, 300 is mounted on the second part 20, which is part of a discontinuous support structure 2 and which is electrically conductive, then the retaining means 103 simultaneously form an automatic connection area that allows each second part 20 to be earthed. If the connection device 100, 200, 300 is mounted on the first part 10, then the retaining means 103 simultaneously form an automatic connection area that allows each first part 10 to be earthed.

The connection device 100, 200, 300 is remarkable in that it comprises at least two automatic connection areas 103, 104, 105, 301, namely:
  a first automatic connection area 103, 104, 301 arranged to automatically create an electrical contact with the first part 10 belonging to the electrical apparatus 1 when it is mounted on the support structure 2, and
  a second automatic connection area 105 arranged to automatically create an electrical contact with the electrical conductor 3 when the electrical apparatus 1 is mounted on the support structure 2.

Figure 5:
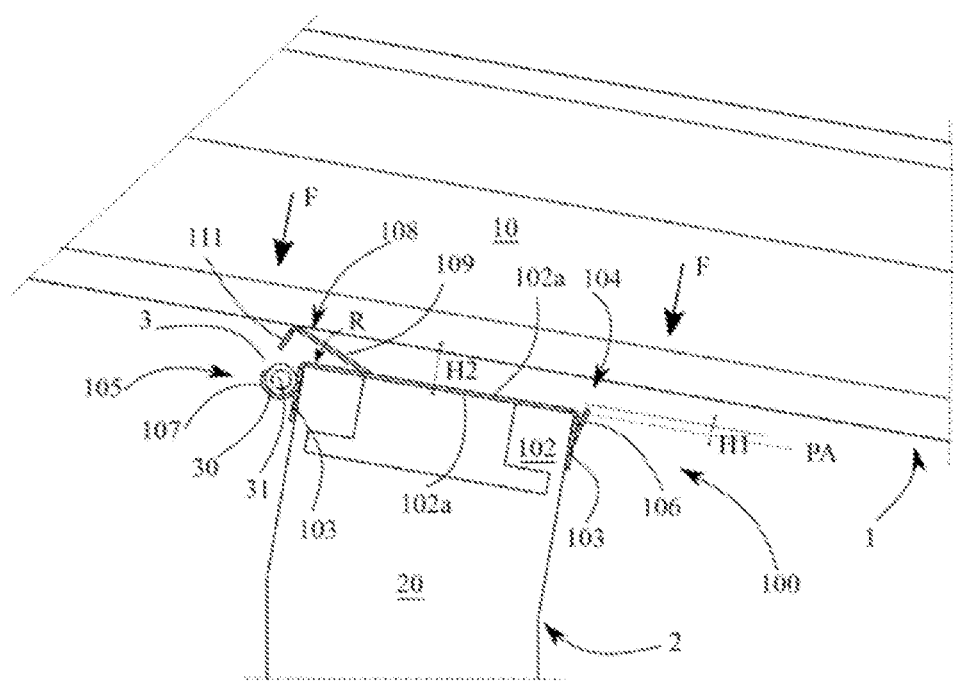
FIG. 5 is a profile view schematically showing the connection device of FIG. 3 inserted between a support and a frame, in the unconnected position.
Figure 6:
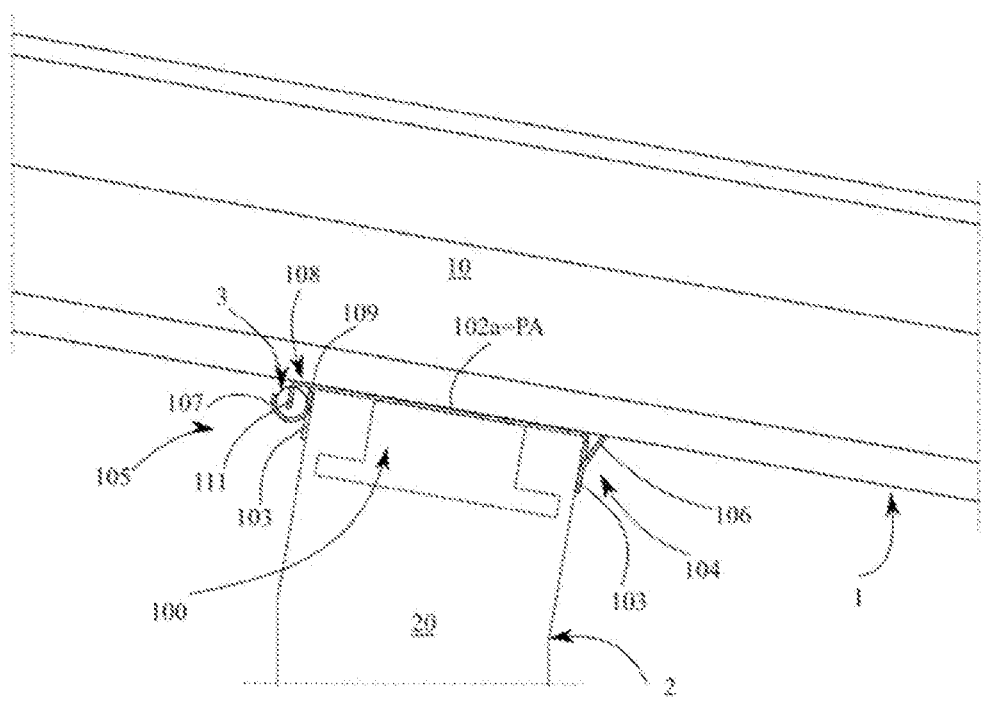
FIG. 6 is a view similar to FIG. 5 of the connection device in the connected position.

Thus and as explained in reference to FIGS. 5 and 6, the electrical apparatus 1 is automatically earthed or connected to a reference potential when it is mounted on the support structure 2 via the connection device 100, 200, 300 and the electrical conductor 3, without tools, screws or any other fastening member. The earthing operation of the electrical apparatuses 1, independent of their number, is quick, easy, reliable and guaranteed without risk of mismatch or decoupling, unlike the conventional solution by wiring, where the fastening screws can loosen subsequent to temperature variations, vibrations and/or other phenomena, and cause equipotential link breaks. Of course, the number and the arrangement of the automatic connection areas 103, 104, 105, 301 may vary depending on various criteria, and in particular the configuration of the first and second parts 10, 20 between which the connection device 100, 200, 300 must be inserted. In the examples of FIGS. 3, 4 and 7, the connection device 100, 200 comprises two automatic connection areas 104, 105, a first automatic connection area 104 dedicated to the first part 10, and a second automatic connection area 105 dedicated to the electrical conductor 3. These two automatic connection areas 104, 105 are separate, distant and arranged on either side of the mounting area 102. In the example of FIG. 8, the connection device 300 further comprises a third automatic connection area 301, also dedicated to the first part 10, but superimposed on the second automatic connection area 105. As mentioned previously, the retaining means 103 can also form automatic connection areas dedicated to the first part 10 that replace or complete the first automatic connection area 104, or dedicated to the second part 20 when it is individual and electrically conductive. In variants that are not shown, these various automatic connection areas 103, 104, 105, 301 can be combined with one another. Moreover, they are not necessarily arranged in opposition, and can be arranged at right angles and/or at different levels, or even combined or superimposed.

In the illustrated examples, the first automatic connection area 104 comprises a toothing 106, formed by cutting and bending in one of the end portions 102b of the blade 101. It is made up of a series of teeth, for example three teeth, this number not being limiting. The teeth forming the toothing 106 are preferably pointed, aligned in a same plane parallel to the assembly plane PA, oriented outside the mounting area 102 in order to project from the assembly plane PA over a height 111 (FIG. 5). Thus, the toothing 106 is arranged to interfere with the first part 10 and to be embedded in the material of this first part 10 when the electrical apparatus 1 is mounted on the support structure 2, and pressed against it by clamping means (not shown), automatically creating an electrical contact between said first part 10 and said connection device 100, 100' (FIG. 6). This electrical contact can extend in whole or in part to the second part 20 if it is at least partially electrically conductive. The first connection area 104 made from a bent portion of the blade 101 thus forms a resilient tab, which has the advantage of ensuring electrical contact with the electrical apparatus 1 even if the clamping pressure varies due either to the expansion of the materials under the effect of outside stresses, or to a loosening of the clamping means of the electrical apparatus 1.

In the illustrated examples, the second automatic connection area 105 comprises a housing 107, 207 for receiving a segment of an electrical conductor 3, and a punching member 108 arranged in line with the housing 107, 207. The housing 107, 207 is a through housing so as to allow the electrical conductor 3 to run along the electrical apparatuses 1 continuously or discontinuously. The punching member 108 is arranged to create an electrical contact with the electrical conductor 3 when the electrical apparatus 1 is mounted on the support structure 2 and pressed against it by clamping means, known in themselves, not shown and which are part of the system for fastening said apparatuses on said structure. These clamping means are for example threaded rods screwed into captive nuts or the like provided at the fastening brackets and tightened by a torque wrench until a tightening torque of approximately 6 N/m is reached, according to the standards in force; however, this value is not limiting. The housing 107, 207 is arranged near the assembly plane PA of the blade 101. In the illustrated examples, the width of the housing 107, 207 substantially corresponds to the diameter of the electrical conductor 3. Likewise, the depth of the housing 107, 207 from the assembly plane PA substantially corresponds to the diameter of the electrical conductor 3. This geometry allows the electrical conductor 3 to be fully received inside said housing 107, 207 without it being compressed either by the housing or by the electrical apparatus 1 when it is mounted on the support structure 2 and pressed against the latter by said clamping means (not shown). The housing 107 is integrated into the connection device and can be formed by cutting and cambering in the end portion 102c of the blade 101 located opposite the first automatic connection area 104, to create a C-shaped gutter according to the embodiment illustrated in FIGS. 4 and 5. The housing 207 can also be formed by cutting and bending in the end portion 102c of the blade 101, to create a C-shaped bearing edge according to the variant embodiment illustrated in FIG. 7. These examples are not limiting and extend to any other embodiment making it possible to perform the function consisting in creating an area for receiving and supporting a segment of an electrical conductor 3 to be able to produce an electrical contact and therefore an equipotential link between said connection device 100, 200, 300 and said electrical conductor 3. The housing 107, 207 could further comprise a sharp edge (not shown) for cutting through at least part of the insulating sheath 30 of the electrical conductor 3 if one is provided. It could also be attached and fastened to the connection device by any suitable means.

The punching member 108 is integrated into the connection device and formed by an L-shaped tab 109 cut in the area of the planar median portion 102a of the blade 101 that emerges in the housing 107, 207. This tab 109 is connected at one of its ends to the blade 101 by a bend 110 forming an articulation. Of course, this embodiment is not limiting and extends to any other form allowing the same functions to be performed. It could for example be attached on the fastening device and fastened to the planar median portion 102a by a hinge or a hinge pin. The tab 109 is provided at the other end with a punch 111, formed by one and for example two pointed teeth, the number of teeth not being limiting. The tooth or teeth forming the punch 111 can be smooth and/or notched over all or part of their length in the manner of fir notches so as to form a harpoon. They are in particular arranged to perforate the insulating sheath 30, if the electrical conductor 3 is provided therewith, and to penetrate the cable 31 of the electrical conductor 3 in order to create said electrical contact and simultaneously to keep it in position in said housing 107, 207. If the teeth of the punch 111 are provided with notches forming a harpoon, they further have the advantage of ensuring electrical contact with the cable 31 of the electrical conductor 3 even if the clamping pressure varies due either to the expansion of the materials under the effect of outside stresses, or to a loosening of the clamping means of the electrical apparatus 1.

This punching member 108 is oriented to project from the assembly plane PA over a height 112 (FIG. 5), when it is in the idle or passive position, in which it is not urged or stressed and in which it opens the housing 107, 207. The opening of the housing 107, 207 must be substantially equal to the diameter of said electrical conductor 3 to be able to enter it without force or compression. Moreover, the punching member 108 is movable from this passive position to an active position, in which it is urged and stressed toward said housing 107, 207 so as to close and simultaneously at least partially penetrate said electrical conductor 3, due to the weight of the electrical apparatus 1 when it is mounted on the support structure 2 (FIG. 6). The passage from the passive position (FIG. 5) to the active position (FIG. 6) of the punching member 108 is done by pivoting of the tab 109 around the bend 110 in the direction of the pivoting arrow R, which is obtained by the bearing forces along the arrows F exerted by the first part 10 toward the second part 20 during the placement of the electrical apparatus 1 on the support structure 2 (see FIG. 5) by said clamping means (not shown). The pivoting of the punching member 108 into the active position automatically creates an electrical contact between said first part 10, if applicable with said second part 20 if it is electrically conductive, and said electrical conductor 3 via said connection device 100, 200, 300.

In FIGS. 3, 4 and 7, the illustrated connection device 100, 200 is doubled, that is to say, it comprises two pairs of a first automatic connection area 104 and a second automatic connection area 105. The two pairs are distant from one another, positioned in parallel and arranged to automatically and simultaneously earth two electrical apparatuses 1 positioned side by side, like in the example illustrated in FIG. 1. This configuration, although practical because it allows the number of connection devices 100, 200 to be reduced by half, is not limiting. Indeed, the connection device 100, 200 could comprise only a single pair of a first automatic connection area 104 and a second automatic connection area 105.

In FIG. 8, the connection device 300 illustrates an example embodiment that comprises only a single pair of a first automatic connection area 104 and a second automatic connection area 105. It further comprises a third automatic connection area 301 superimposed on the second automatic connection area 105. More particularly, this third automatic connection area 301 is formed by cutting and bending of a pointed tooth 302 in the tab 109 of the punching member 108. The tooth 302 is oriented outside the mounting area 102 to project from the assembly plane PA. This example embodiment is not limiting, given that this third automatic connection area 301 can be positioned independent of the location in the planar median portion 102a of the blade 101 that corresponds to said assembly plane PA. Furthermore, it could replace the first automatic connection area 104, which would therefore be eliminated.

The connection device 100, 200, 300 according to the invention is implemented naturally, without constraint, or tools, or other fastening members. With reference to the installation mode illustrated in FIGS. 1, 5 and 6, each connection device 100, 200, 300 is fitted on a second part 20 belonging to the support structure 2 based on the electrical apparatus or apparatuses 1 to be mounted and placed at the same potential, having specified that this assembly is not exclusive and that it could be mounted on the first part 10. In this case, its geometry will be adapted to that of said first part 10. The electrical conductor 3 is deposited very simply in the open housing 107, 207 of each connection device 100, 200, 300 to connect them in parallel. Depending on the installation, several electrical conductors 3 can be provided in parallel. The installation and fastening of the electrical apparatus or apparatuses 1 on the support structure 2 via their own clamping means (not shown) automatically create an equipotential link between the various electrically conductive elements making it possible to guarantee the absence of electrical potential in the installation. Indeed, the clamping force exerted by said clamping means on the connection device 100, 200, 300 inserted between the electrical apparatus 1 and the support structure 2 serves to simultaneously crush all of the automatic connection areas 104, 105, 301 projecting from the assembly plane PA, to fold the punching member 108 into the active position, to embed the teeth and toothings 106, 302 into the material at least of said first part 10, and to automatically create an electrical contact between the first part 10 belonging to said electrical apparatus 1, if applicable the second part 20 belonging to said support structure 2, the connection device 100, 200, 300 and the electrical conductor 3, earthed or at a reference potential.

The material of the connection device 100, 200, 300 ensures an electrical continuity that is stable over time, without degradation of the other materials used. Unlike the conventional wiring solution, the connection device 100, 200, 300 according to the invention does not use screws and washers, or additional fastening members, and is not subject to loosening caused by temperature variations or vibrations. It is thus reliable over time, irrespective of climate and environmental conditions.

The present invention is of course not limited to the described example embodiments, but encompasses any modifications and variants that are obvious to those skilled in the art.

The invention claimed is:

1. A connection device for earthing an electrical apparatus and/or creating an equipotential link between two conductive elements, arranged to be inserted between a first part and a second part, said first part belonging to said electrical apparatus and being electrically conductive, and said second part belonging to a support structure on which said electrical apparatus is mounted and which may be at least partly electrically insulating, said connection device comprising a first connection area arranged to create electrical contact between said connection device and said first part when said electrical apparatus is mounted on said support structure, characterized in that said connection device further comprises a second connection area separate and distant from said first connection area, arranged to create electrical contact between said connection device and an electrical conductor when said electrical apparatus is mounted on said support structure, such that an equipotential link is created between at least said electrical apparatus and said electrical conductor when being mounted on said support structure via said connection device and said electrical conductor, earthed or connected to a reference potential, and in that said second connection area comprises a housing part for supporting a segment of said electrical conductor, wherein said housing part is a through housing part configured to allow said electrical conductor to run along said electrical apparatus, and a punching member arranged in line with said housing part and arranged to be embedded at least partially in said electrical conductor, to create an electrical contact with said electrical conductor, and simultaneously to keep it in position in said housing part, when said electrical apparatus is mounted on said support structure, said punching member being urged and stressed toward said housing part by said electrical apparatus to close and simultaneously at least partially penetrate said electrical conductor, when said electrical apparatus is mounted on said support structure;

further comprising an electrically conductive metal piece formed by stamping and bending a flat metal sheet, wherein said first connection area and said second connection area are formed in said electrically conductive metal piece by cutting and bending, wherein the connection device further comprises
 a mounting area arranged to assemble said connection device to one of said first and second parts by fitting,
 said mounting area comprising an assembly plane (PA) arranged to be inserted between said first and second parts, and
wherein said first connection area comprises a pointed toothing projecting from said assembly plane (PA), arranged to become embedded in the material of said first part when said electrical apparatus is mounted on said support structure.

2. The connection device according to claim 1, wherein the toothing of said first connection area is formed by cutting and bending in a bent portion of said electrically conductive metal piece.

3. A connection device for earthing an electrical apparatus and/or creating an equipotential link between two conductive elements, arranged to be inserted between a first part and a second part, said first part belonging to said electrical apparatus and being electrically conductive, and said second part belonging to a support structure on which said electrical apparatus is mounted and which may be at least partly electrically insulating, said connection device comprising
 a first connection area arranged to create electrical contact between said connection device and said first part when said electrical apparatus is mounted on said support structure,
characterized in that said connection device further comprises
 a second connection area separate and distant from said first connection area, arranged to create electrical contact between said connection device and an electrical conductor when said electrical apparatus is mounted on said support structure, such that an equipotential link is created between at least said electrical apparatus and said electrical conductor when being mounted on said support structure via said connection device and said electrical conductor, earthed or connected to a reference potential, and in that said second connection area comprises
 a housing part for supporting a segment of said electrical conductor, wherein said housing part is a through housing part configured to allow said electrical conductor to run along said electrical apparatus, and
 a punching member arranged in line with said housing part and arranged to be embedded at least partially in said electrical conductor, to create an electrical contact with said electrical conductor, and simultaneously to keep it in position in said housing part, when said electrical apparatus is mounted on said support structure, said punching member being urged and stressed toward said housing part by said electrical apparatus to close and simultaneously at least partially penetrate said electrical conductor, when said electrical apparatus is mounted on said support structure;

further comprising an electrically conductive metal piece formed by stamping and bending a flat metal sheet, wherein said first connection area and said second connection area are formed in said electrically conductive metal piece by cutting and bending, and wherein said through housing part is formed by cutting and bending, or cambering in a bent portion of said electrically conductive metal piece, and in that said punching member is formed by an L-shaped tab cut into a straight part of said electrically conductive metal piece, connected at one of its ends to said electrically conductive metal piece by a bend forming an articulation and provided at the other end with at least one pointed and/or notched tooth forming a punch.

4. A connection device for earthing an electrical apparatus and/or creating an equipotential link between two conductive elements, arranged to be inserted between a first part and a second part, said first part belonging to said electrical apparatus and being electrically conductive, and said second part belonging to a support structure on which said electrical apparatus is mounted and which may be at least partly electrically insulating, said connection device comprising
 a first connection area arranged to create electrical contact between said connection device and said first part when said electrical apparatus is mounted on said support structure,
 a second connection area separate and distant from said first connection area, arranged to create electrical contact between said connection device and an electrical conductor when said electrical apparatus is mounted on said support structure, such that an equipotential link is created between at least said electrical apparatus and said electrical conductor when being mounted on said support structure via said connection device and said electrical conductor, earthed or connected to a reference potential, said second connection area comprises
 a housing part for supporting a segment of said electrical conductor, wherein said housing part is a through housing part configured to allow said electrical conductor to run along said electrical apparatus, and
 a punching member arranged in line with said housing part and arranged to be embedded at least partially in said electrical conductor, to create an electrical contact with said electrical conductor, and simultaneously to keep it in position in said housing part, when said electrical apparatus is mounted on said support structure, said punching member being urged and stressed toward said housing part by said electrical apparatus to close and simultaneously at least partially penetrate said electrical conductor, when said electrical apparatus is mounted on said support structure;

an electrically conductive metal piece formed by stamping and bending a flat metal sheet, and wherein said first connection area and said second connection area are formed in said metal piece by cutting and bending;

wherein the connection device further comprises
   a mounting area arranged to assemble said connection device to one of said first and second parts by fitting, said mounting area comprising an assembly plane (PA) arranged to be inserted between said first and second parts;
wherein the connection device further comprises a third connection area comprising at least one pointed tooth projecting from said assembly plane (PA); and
wherein said third connection area is superimposed on said punching member.

* * * * *